United States Patent [19]

Pi

[11] 4,024,738
[45] May 24, 1977

[54] FASTENER FOR MOTORCYCLE DRIVER'S HELMET

[76] Inventor: Ching-Tien Pi, No. 34, Lane 98, Tung Hua St., Taipei, China /Taiwan

[22] Filed: Oct. 7, 1975

[21] Appl. No.: 620,365

[52] U.S. Cl. .................................. 70/59; 211/8; 211/30; 248/203; 224/31; 224/38
[51] Int. Cl.² ........................................ E05B 69/00
[58] Field of Search ............ 70/58, 59; 211/30–33, 211/8; 223/24, 25, 66, 84; 248/203

[56] References Cited
UNITED STATES PATENTS 3,837,545  9/1974  Rogers ................................ 70/59 X

*Primary Examiner*—James C. Mitchell
*Attorney, Agent, or Firm*—Burns, Doane, Swecker & Mathis

[57] ABSTRACT

Fastener for motorcycle driver's helmet comprising a pair of individual members each formed by bending an endless loop of plastic coated wire into a generally hollow U-shaped formation having an inner tongue which is adapted to be inserted under the helmet and an outer ring. On top of the ring there is welded an ear inclined at a 45° angle. The ears include holes for receiving a lock to fasten the helmet to the rear of the seat of the motorcycle. Auxiliary clamp means is further provided to attach the fastener members to the rear shelf of the motorcycle.

6 Claims, 11 Drawing Figures

FASTENER FOR MOTORCYCLE DRIVER'S HELMET

FIELD OF INVENTION

The present invention relates generally to a helmet fastener and more particularly to a fastener for a motorcycle driver's helmet adapted to fasten the helmet to the rear of the seat of motorcycle when not in use.

BACKGOUND OF INVENTION

A helmet is a necessary safety item for a motorcycle driver when he is riding. However, during parking, the helmet becomes a cumbersome item which is too heavy to be carried around and no appropriate means is available for keeping it on the motorcycle. The driver may find his helmet stolen when he returns to the parked motorcycle where he left the helmet without protection.

SUMMARY OF INVENTION

Therefore the main object of the present invention is to provide a fastening means that would enable the helmet to be safely left on the motorcycle.

Another object of the present invention is to provide a fastener for a motorcycle driver's helmet that is simply constructed and light weight and with means to enable the helmet to be locked up at the rear of the seat of a motorcycle.

A further object of the present invention is to provide an auxiliary clamp means to attach the members of the fastener to the rear shelf of the motorcycle.

Still another object of the present invention is to provide a helmet fastener which is so designed to fit any size helmet.

Other objects and features of the present invention will become apparent from the following detailed description to be taken in conjunction with the annexed drawings.

DETAILED DESCRIPTION OF EMBODIMENT

Figure 1:
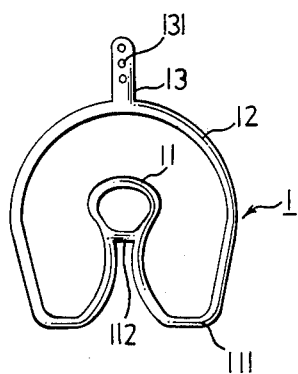
FIG. 1 depicts an elevation of a member of the pair of fastener elements.

Now referring to FIG. 1, a member 1 of the pair of fastener elements 1, 1' which form the present invention is formed by bending an endless loop of plastic-coated wire into a generally hollow U shaped formation having an inner tongue 11 defined by an inner bight portion of the U and an outer ring 12 defined by an outer bight portion of the U. The ring 12 simulates the outside curvature of the helmet. On top of the outer ring 12 is welded an ear 13, having a hole 131 in it. The inner tongue is further closed up to form a circular formation with a short arc 112. Outer ends of the leg portions of the U are flat as shown at 111.

Figure 2:
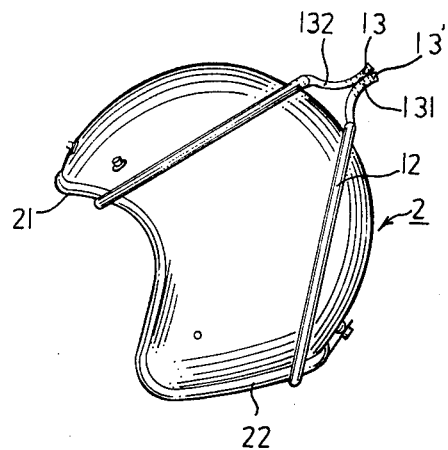
FIG. 2 depicts a side view with the pair of fastener members being applied to a helmet.

As may be seen in FIG. 2, the profile of the ear 13 is shown, where the portion 132 of the ear extending from the outer ring 12 is first bent to a 45° angle then straight upward. The advantage of the 45° bend is to enable the fastener to fit any size of helmet which is to be detailed later on in FIGS. 5, 6 and 7.

Figure 3:
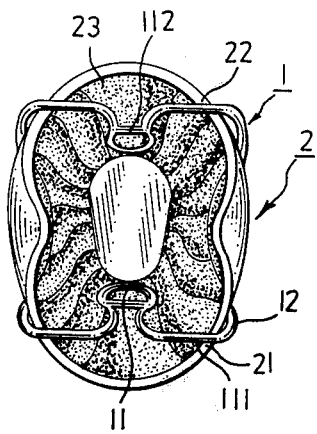
FIG. 3 is a bottom view showing how the inner tongues are inserted under the helmet.
Figure 4:
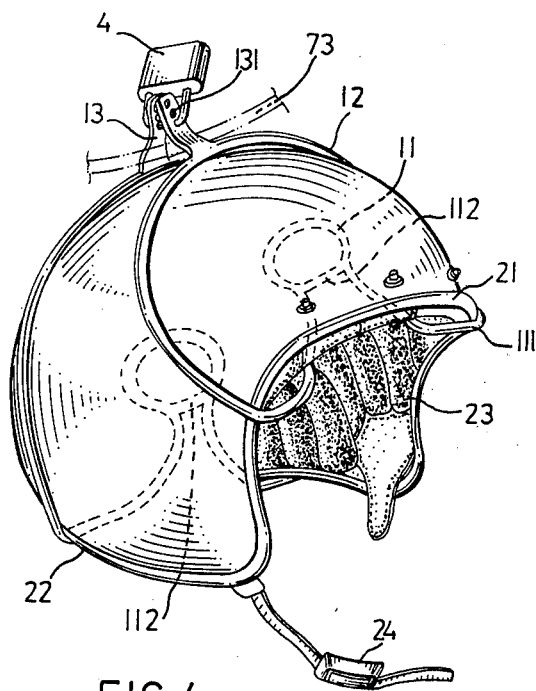
FIG. 4 is a perspective view showing how a helmet is being locked to the rear of a motorcycle seat.

The inner tongue 11 of each member 1, 1' is to be inserted under the helmet 2 generally as shown in FIG. 3 and FIG. 4 with the flat portions 111 of the members situated at the front rim 21 and lower rim 22 of the helmet 2. The 45° inclined ears 13—13' are oriented face to face so that both holes 131 match such as shown in FIG. 2. In FIG. 4, a lock means is applied through holes 131—131 and the space between two inclined ears 13—13' is provided for retaining a bar member 73 located behind the rear shelf of the seat so that the helmet may be fastened to the motorcycle. Numeral 24 designates the chin strap of the helmet.

The wire used to form the fastener members 1, 1' is plastic coated so as not to damage the rims of the helmet as well as the padding material 23 under the helmet.

Figure 5:
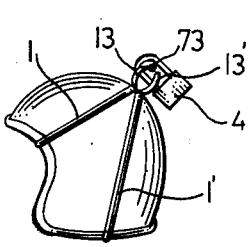
FIGS. 5, 6 and 7 show the various ways to apply the hanger members to helmets of different sizes.
Figure 6:
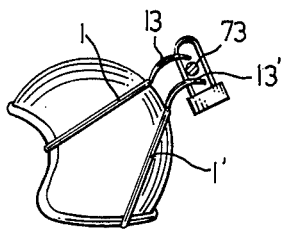
Figure 7:
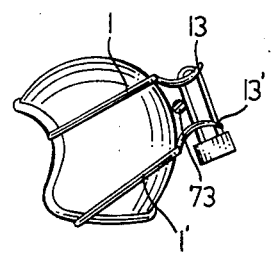

FIGS. 5, 6 and 7 show how the fastener may fit different sizes of helmet. In FIG. 5 the members 1 and 1' are oriented with ears 13 and 13' back to back; the bar member 73 behind the rear shelf of the motorcycle seat is enclosed in the lock means 4, this being the case when applied to small size helmet.

In FIG. 6, the members 1 and 1' are oriented with the back of ear 13 toward the face of ear 13'; the bar member 73 behind the rear shelf of the seat is also enclosed in the lock means, this being the case when applied to medium size helmet.

In FIG. 7, the members 1 and 1' are oriented with ears 13 and 13' face to face, to cope with a large size helmet. The bar member 73 behind the rear shelf of the seat is retained within the space provided between the inclined ears 13 and 13' of the members 1 and 1'.

From FIGS. 5, 6 and 7, the advantage of the 45° inclination can easily be appreciated, which provides the flexibility of use to meet the requirement of helmets of various sizes.

Figure 8:
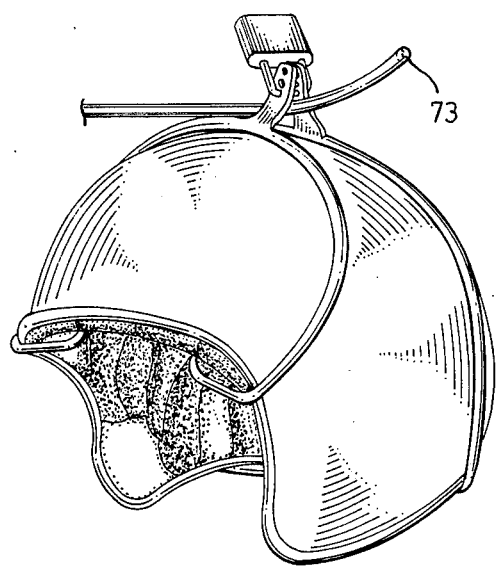
FIG. 8 shows how the fastener is used to hang the helmet on the end of rear shelf of motorcycle.

FIG. 8 shows how the helmet is fastened to the end of the rear shelf of the motorcycle. The helmet is being hung there on the bar member 73 of the shelf.

Figure 9:
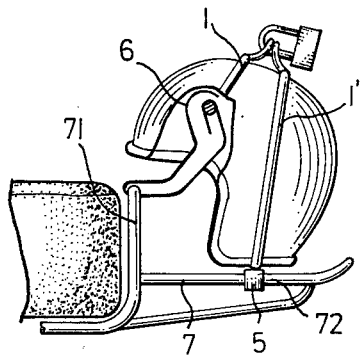
FIG. 9 shows two auxiliary clamps are provided to attach the members of the fastener to the rear shelf of a motorcycle.

FIG. 9 shows how the fastener members are attached to bars 71 and 72 of the shelf 7 at the rear of the seat by clamp means 5 and 6, so that when not in use, the fastener members may be laid down on the shelf along the arrow direction and still attached to the shelf without being afraid of loss.

Figure 10:
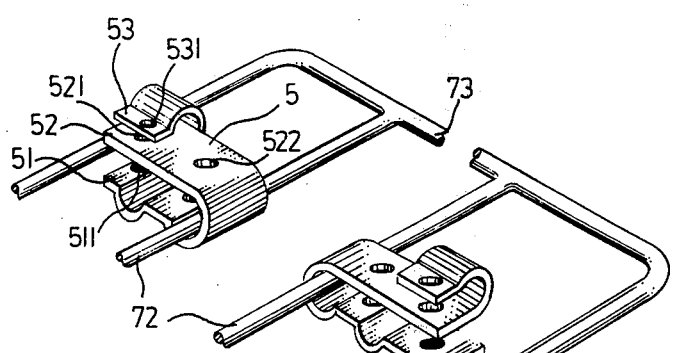
FIG. 10 shows a perspective view of the first auxiliary clamp.

FIG. 10 shows the details of the clamp means or the first clamp members 5 which are a symmetrical pair. Each clamp 5 has a flat U shape to clamp on longitudinal bar 72 of the shelf 7 with screw 522 passing through lower and upper legs 51-52. At the end of the upper leg 52, an inverted L member 53 is formed integrally thereon and holes 511, 521 and 531 are formed respectively on 51, 52 and 53. Hole 511 is threaded to take a bolt 512, and the flat portions 111-111 of second member 1' of the fastener are retained in the space between inverted L 53 and upper leg 52 (see also FIG. 11).

Figure 11:
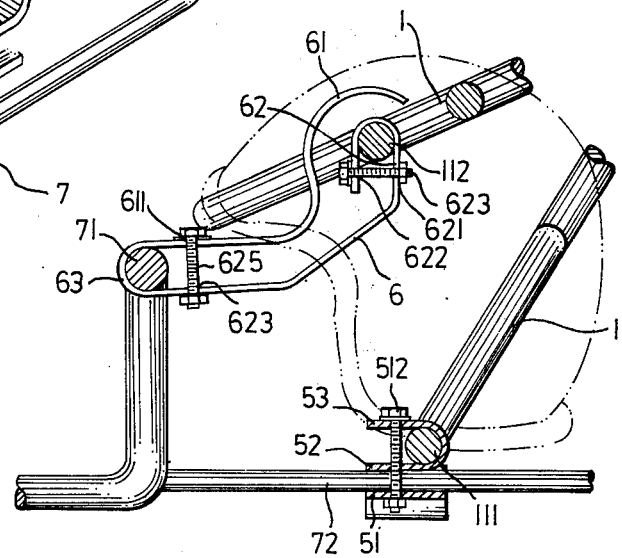
FIG. 11 shows a side view of the second auxiliary clamp.

FIG. 11 shows another clamp means or the second clamp member 6 which is formed by bending a piece of flat iron bar into a hollow L shaped loop 60 with ends 61, 62 of the flat bar overlapped to form a first leg of the hollow L. At inner end 62, the flat bar is bent to enclose the arc 112 of first member 1 of the fastener and retained therein by a bolt 624 through holes 621, 622 formed near the bend. Hole 621 is threaded to take the bolt 624. At another bend 63 of a second leg of the hollow L, the lateral bar 71 at the rear of the seat is enclosed therein by a bolt-nut set 625 through holes 611 and 623 near bend 63 of the second leg of hollow L.

When the fastener is not in use, the clamp means, with retained members of the fastener, can be laid down on the shelf without being afraid of loss.

The above embodiment is given only for illustration purpose and not by way of limitation, and modification will become evident to those skilled in the art which will fall within the scope of attached claims.

What is claimed is:

1. A fastener for securing a motorcycle helmet to a motorcycle, comprising first and second fastener members, each fastener member comprising an endless loop of wire of hollow U-shaped formation including:
    a tongue defined by an inner bight portion of the hollow U-shaped formation, said tongue having a short curved arc and being adapted to be inserted under the helmet;
    an outer ring defined by an outer bight portion of the hollow U-shaped formation and configured to simulate the outside curvature of a helmet;
    an ear secured to the top of the outer ring, said ear having a hole therein for receiving a lock;
    a pair of flat sections defined by outer ends of leg portions of the hollow U-shaped formation, said flat sections being configured to receive a rim of the helmet;
said fastener members being insertable around front and lower portions of a helmet, with the flat sections of one member engaging the front rim of the helmet and the flat portions of the other member engaging the lower rim of the helmet, and with the openings in said ears being substantially aligned for receiving a lock.

2. A fastener according to claim 1 wherein a portion of each ear is inclined 45° from the outer ring portion, so that the fastener members may be disposed around a helmet with the ears selectively oriented in one of face-to-face, face-to-back, and back-to-back positions, to conform to helmets of various size.

3. A fastener according to claim 1 wherein each fastener member comprises plastic-coated wire.

4. A fastener according to claim 3 further including clamp means for securement to a motorcycle; said clamp means comprising a pair of first clamps for clamping one of said fastener members to a rear shelf of a motorcycle, and a second clamp for clamping the other fastener member to the rear shelf.

5. A fastener according to claim 4 wherein said first clamps are identical and each comprises:
    a U-shaped portion including a pair of legs arranged to be inserted onto longitudinal bars of the rear shelf, said legs including aligned apertures for receiving a screw, and
    an inverted L-shaped member joined to an upper one of said legs, said legs and said L-shaped member including apertures receiving a bolt to retain the flat section of one of said fastener members.

6. A fastener according to claim 4 wherein said second clamp comprises a piece of flat iron bar bent into a hollow L-shaped loop; one leg of said L-shaped loop being formed by the ends of said bar in an overlapped condition; one of said ends comprising a first U-shaped bend to receive the tongue of one of said fastener members, said first U-shaped bend having first aligned apertures for receiving a first bolt to retain said tongue; the other leg of said L-shaped loop including a second U-shaped bend which receives a lateral bar at the rear of the motorcycle seat and which includes second aligned apertures for receiving a second bolt to retain the lateral bar.

* * * * *